(12) United States Patent
Yang

(10) Patent No.: US 11,144,674 B2
(45) Date of Patent: Oct. 12, 2021

(54) METHOD AND SYSTEM FOR RISK IDENTIFICATION OF PERSONAL INFORMATION

(71) Applicant: Inje University Industry-Academic Cooperation Foundation, Gimhae-Si (KR)

(72) Inventor: Jinhong Yang, Gimhae-Si (KR)

(73) Assignee: Inje University Industry-Academic Cooperation Foundation, Gimhae-Si (KR)

(*) Notice: Subject to any disclaimer, the term of this patent is extended or adjusted under 35 U.S.C. 154(b) by 195 days.

(21) Appl. No.: 16/460,687

(22) Filed: Jul. 2, 2019

(65) Prior Publication Data
US 2020/0125766 A1 Apr. 23, 2020

(30) Foreign Application Priority Data

Oct. 23, 2018 (KR) .................. 10-2018-0126670
Oct. 23, 2018 (KR) .................. 10-2018-0126674
Oct. 23, 2018 (KR) .................. 10-2018-0126716

(51) Int. Cl.
*G06F 21/62* (2013.01)
*H04L 29/06* (2006.01)
(Continued)

(52) U.S. Cl.
CPC ....... *G06F 21/6263* (2013.01); *G06Q 50/265* (2013.01); *H04L 9/0637* (2013.01); *H04L 63/1433* (2013.01)

(58) Field of Classification Search
None
See application file for complete search history.

(56) References Cited

U.S. PATENT DOCUMENTS

2004/0103120 A1* 5/2004 Fickle ................. H04L 67/22
2008/0208696 A1* 8/2008 Olson ................ G06Q 20/202
705/16
(Continued)

FOREIGN PATENT DOCUMENTS

JP 2010-176230 A 8/2010
KR 10-2000-0026496 A 5/2000
(Continued)

OTHER PUBLICATIONS

Office Action dated Dec. 30, 2019, issued in Korean Application No. 10-2018-0126716, filed Oct. 23, 2018, 6 pages.
(Continued)

*Primary Examiner* — William J. Goodchild
(74) *Attorney, Agent, or Firm* — Christensen O'Connor Johnson Kindness PLLC

(57) ABSTRACT

In some embodiments, a method for risk identification of personal information of a service/platform provider side is provided. A specification is received related to data usage for at least one among service and application of a third party side from a device of the third party side, and is stored in data storage of the service/platform provider side. User consent information is received from a user side using at least one among the service and application. The received information is stored in the data storage of the service/platform provider side. A process is inspected and monitored related to data storing and processing in user environment or platform environment of the user side using at least one among the service and application. A monitoring function is provided for data stored in the data storage of the service/platform provider side in connection with at least one among the service and application.

19 Claims, 9 Drawing Sheets

(51) Int. Cl.
    *G06Q 50/26*    (2012.01)
    *H04L 9/06*    (2006.01)

(56) References Cited

U.S. PATENT DOCUMENTS

2011/0142016 A1*  6/2011  Chatterjee ............... H04L 67/22
                                                           370/338
2013/0219217 A1*  8/2013  Seren ................. G06F 11/3664
                                                            714/27
2017/0163733 A1*  6/2017  Grefen ................. H04L 9/3236

FOREIGN PATENT DOCUMENTS

KR    10-2007-0061117 A    6/2007
KR          101320515 B1   10/2013
KR          101528785 B1    6/2015
KR           10-590076 B1   2/2016

OTHER PUBLICATIONS

Oh, H., et al., "A Study on GDPR Compliant Blockchain based Personally Identifiable Information Management Framework," Proceedings of Symposium of the Korean Institute of Communications and Information Sciences, 2018.6: 1186-1187, Dec. 9, 2019.
Korean Office Action dated Mar. 16, 2020, issued in Korean Application No. 10-2018-0126670, filed Oct. 23, 2018, 5 pages.

* cited by examiner

METHOD AND SYSTEM FOR RISK IDENTIFICATION OF PERSONAL INFORMATION

CROSS-REFERENCES TO RELATED APPLICATIONS

This application claims the priority benefit of Korean Patent Application Nos. 10-2018-0126670, 10-2018-0126674, and 10-2018-0126716 filed on Oct. 23, 2018, in the Korean Intellectual Property Office, the disclosure of which is incorporated herein by reference.

BACKGROUND

1. Field of the Invention

The present disclosure relates to method and system for risk identification of personal information.

2. Description of Related Art

In today's data driven digital economy, user-related information works as oil to run this world. Users are providing privacy information willingly or unwillingly to the well-known or unknown service providers. Privacy information often reveals one's PII (Personally Identifiable Information). Many researchers have identified mobile apps as a great source of privacy leaking in the digital world. Many mobile apps collect user's sensitive information during installation, usage, and uninstallation. Apps permission authenticity and reliability have faced the questions from time to time by several researchers. There is a report that the global annual economic loss caused by the data leaking would be over 2.1 trillion USD by 2019.

A study stated 87% of the USA population are highly identifiable by using only 5-digit zip, sex, date of birth. Nowadays, people are getting conscious of securing PII as an asset but still, apps are demanding excess permission and some of requested permissions are irrelevant to basic purpose. As of 2018, total android and apple users are 2 and 1.3 billion with 2.8 and 2.2 million apps, respectively. KISA (Korean Internet and Security Agency)'s surveyed common opinion about information security and found two main public concerns on permissions requested by apps; 'undesired and imprudent collection of PII is 33.3%', and 'illicit use of collected PII is 27.6%'. A tech-security company Gemalto's BLI (Breach Level Index) revealed that an avg. 10.4 million PII evidence are exposed each day where 74% were identity theft.

To deal with such problems, many countries and organizations initiated to reduce personal data breaching. For instance, EU-GDPR (European General Data Protection Regulation), Australia's Privacy Amendment, Personal Information Protection and Electronic Documents Act by Canada, ISO27001 by International Organization for Standardization have been proposed to control personal data collection process. Up to 2% of total revenue or 20 million euro to any organizations may be fined if they fail to protect PII. GDPR mainly focuses violation notification, right to access, right to be forgotten, data movability, and privacy by design and information security officer. From Android version 8.1 (API level 27 and higher), there are three (normal, signature and dangerous permission) protection levels that affects third party app data access and collections. Several studies also show that personal data leak through privacy permission request by apps. Since data volume and source are increasing rapidly, preventive action should be more drastically required. In designing preventive, personal data leaking by inter-publisher or organization data distribution for PII gathering should be seriously considered

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

At least one example embodiment provides a method for risk identification of personal information of a third party side generating and providing a specification for service and/or application and collecting and managing data related to service and/or application, a computer device performing the method for risk identification of personal information, a computer program connected with the computer device and stored in computer-readable recording medium to execute the method for risk identification of personal information in the computer device, and the computer-readable recording medium.

At least one example embodiment provides a method for risk identification of personal information of a service/platform provider side receiving and managing a specification for service and/or application from a third party side and user consent information from a user side using service and/or application, inspecting and monitoring a process related to data storing and processing in user environment or platform environment of the user side, and providing a monitoring function for data stored in data storage of the service/platform provider side, a computer device performing the method for risk identification of personal information, a computer program connected with the computer device and stored in computer-readable recording medium to execute the method for risk identification of personal information, and the computer-readable recording medium.

At least one example embodiment provides a method for risk identification of personal information of a user side storing and providing user consent information for service and/or application of a third party side, monitoring whether to physically access to data storage of a client device, and providing a query function for collected data present situation, a computer device performing the method for risk identification of personal information, a computer program connected with the computer device and stored in computer-readable recording medium to execute the method for risk identification of personal information in the computer device, and the computer-readable recording medium.

A method for risk identification of personal information of a service/platform provider side includes receiving a specification related to data usage for at least one among service and application of a third party side from a device of the third party side and storing the received specification in data storage of the service/platform provider side; receiving user consent information from a user side using at least one among the service and application and storing the received information in the data storage of the service/platform provider side; inspecting and monitoring a process related to data storing and processing in user environment or platform environment of the user side using at least one among the service and application; and providing a monitoring function for data stored in the data storage of the service/platform provider side in connection with at least one among the service and application.

According to an aspect of at least one example embodiment, the method for risk identification of personal information may further include specifying information for security, nonidentification, and anonymization related to the data storing and processing, and determining whether to register for at least one among the service and application based on the specified information.

According to another aspect of at least one example embodiment, the method for risk identification of personal information may further include monitoring access to the data storage from the outside in case that the data storage related to the data storing and processing is service provided in SaaS (Software as a Service) form.

According to another aspect of at least one example embodiment, at least part of the data stored in the data storage of the service/platform provider side may be managed in snapshot form.

According to another aspect of at least one example embodiment, the method for risk identification of personal information may further include transmitting the snapshot formed data to a system of the third party side, and the snapshot formed data transmitted to the system of the third party side may be distributively stored on blockchain related to the third party side.

According to another aspect of at least one example embodiment, the method for risk identification of personal information may further include examining at least one among the service and application and registering whether to monitor the related information on platform on client of the user side or PaaS (Platform as a Service), in order to monitor whether at least one among the service and application interworks with external service.

According to another aspect of at least one example embodiment, the method for risk identification of personal information may further include examining communication with a server using a network address which is not specified on the specification or not authenticated.

According to another aspect of at least one example embodiment, the providing a monitoring function may provide the monitoring function for data stored in the data storage of the service/platform provider side by at least one among the service and application or data collected by the service/platform provider side to provide service.

A method for risk identification of personal information includes receiving and storing input for user consent information for at least one among the service and application of the third party side from the user side; transmitting the user consent information to the device of the service/platform provider side through network; monitoring whether to physically access to the data storage included in the device of the user side using at least one among the service and application; and providing a user data query function which is possible to query for data present situation related to at least one among the service and application.

According to an aspect of at least one example embodiment, the method for risk identification of personal information may further include transmitting the user consent information to the system of the third party side; and outputting information for a method for storing and managing the user consent information to the user side.

According to another aspect of at least one example embodiment, the user consent information transmitted to the system of the third party side may be distributively stored on blockchain related to the third party side.

According to an aspect of at least one example embodiment, the method for risk identification of personal information may further include providing a function for verifying the stored user consent information.

According to another aspect of at least one example embodiment, the monitoring may include monitoring whether to physically access to the data storage included in the device of the user side by using a sandbox function provided by OS included by the device of the user side or service platform of service provided to the device of the user side.

According to another aspect of at least one example embodiment, the method for risk identification of personal information may further include deleting data in the sandbox according to a request of the user side.

According to another aspect of at least one example embodiment, the providing a user data query function may provide the user data query function at least one point among start point and end point of at least one among the service and application.

According to another aspect of at least one example embodiment, the providing a user data query function may receive a information management function in which the user data query function is included from the device of the service/platform provider side controlling the device of the user side, and provide the function to the user side.

A method for risk identification of personal information includes generating a specification related to data usage for at least one among service and application of the third party side; transmitting the generated specification to the device of the service/platform provider side through network; collecting data related to at least one among the service and application through network from the device of the service/platform provider side or the device of the user side receiving and using at least one among the service and application through the device of the service/platform provider side, and storing the collected data in data storage; and providing information for utilization of the data stored in the data storage according to a request from the outside.

According to an aspect of at least one example embodiment, the method for risk identification of personal information may further include deleting the collected data related to a corresponding user in the data storage according to a request from the device of the user side.

According to another aspect of at least one example embodiment, the method for risk identification of personal information may further include transmitting the generated specification to a system of the third party side.

According to another aspect of at least one example embodiment, the specification transmitted to the system of the third party side may be distributively stored on blockchain related to the third party side.

According to another aspect of at least one example embodiment, the providing information may provide a function capable of monitoring the information for utilization of the data in statistics form according to a request of at least one among the device of the user side, the device of the service/platform provider side, and a government agency.

It is provided with a computer program connected with a computer device and stored in computer-readable recording medium to execute the method for risk identification of personal information in the computer device.

It is provided with computer-readable recording medium in which a computer program to execute the method for risk identification in the computer device is recorded.

A computer device includes at least one processor implemented to execute computer-readable instructions, and the computer device, by the at least one processor, receives a specification related to data usage for at least one among service and application of a third party side from a device of the third party side and stores the received specification in data storage of a service/platform provider side, receives user consent information from a user side using at least one among the service and application and stores the received information in the data storage of the service/platform provider side, inspects and monitors a process related to data storing and processing in user environment or platform environment of the user side using at least one among the service and application, and providing a monitoring function for data stored in the data storage of the service/platform provider side in connection with at least one among the service and application.

A computer device includes at least one processor implemented to execute computer-readable instructions, and the computer device, by the at least one processor, receives and stores input for user consent information for at least one among the service and application of the third party side from the user, transmits the user consent information to the device of the service/platform provider side through network, monitors whether to physically access to the data storage included in the device of the user side using at least one among the service and application, and provides a user data query function which is possible to query for data present situation related to at least one among the service and application.

A computer device includes at least one processor implemented to execute computer-readable instructions, and the computer device, by the at least one processor, generates a specification related to data usage for at least one among service and application of the third party side, transmits the generated specification to the device of the service/platform provider side through network, collects data related to at least one among the service and application through network from the device of the service/platform provider side or the device of the user side receiving and using at least one among the service and application through the device of the service/platform provider side and stores the collected data in data storage, and provides information for utilization of the data stored in the data storage according to a request from the outside.

According to example embodiments, it may provide a technology for risk identification for personal information for generating and providing a specification for service and/or application in the view of a third party side, and collecting and managing data related to the service and/or application.

According to example embodiments, it may provide a technology for risk identification of personal information for receiving and managing a specification for service and/or application from a third party side in the view of a service/platform provider side and user consent information from a user side using the service and/or application, inspecting and monitoring a process related to data storing and processing in user environment or platform environment of user side, and providing a monitoring function for data stored in data storage of service/platform provider side.

According to example embodiments, it may provide a technology for risk identification of personal information for storing and providing user consent information for service and/or application of a third party side in the view of a user side, monitoring whether to physically access to data storage of a client device (a device of the user side), and providing a query function for collected data present situation.

DESCRIPTION OF THE DRAWINGS

These and/or other aspects, features, and advantages of the present disclosure will become apparent and more readily appreciated from the following description of embodiments, taken in conjunction with the accompanying drawings of which.

DETAILED DESCRIPTION

While illustrative embodiments have been illustrated and described, it will be appreciated that various changes can be made therein without departing from the spirit and scope of the invention.

Hereinafter, some example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments.

A system for risk identification of personal information according to an example of embodiments may be implemented by at least one computer device. A computer program according to an example of embodiments may be installed and run in the computer device, and the computer device may perform a method for risk identification of personal information according to an example of embodiments according to control of the run computer program. The above described computer program may be connected with the computer device and stored in computer-readable recording medium to execute the method for risk identification of personal information in the computer device.

Figure 1:
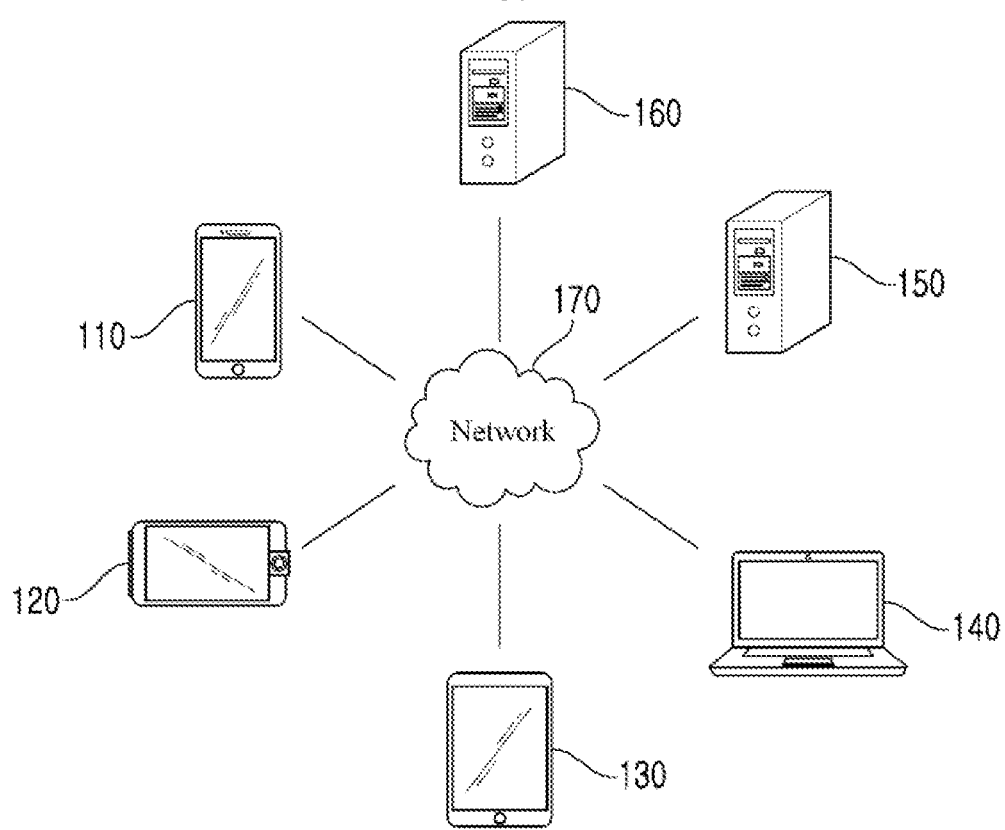
FIG. 1 is a drawing illustrating an example of network environment according to an example of embodiments.

FIG. 1 is a drawing illustrating an example of network environment according to an example of embodiments. The network environment of FIG. 1 represents an example including a plurality of electronic devices 110, 120, 130, 140, a plurality of servers 150, 160, and a network 170. FIG. 1 is an example for description of invention, and the number of electronic devices and servers is not limited as FIG. 1. Also, the network environment of FIG. 1 just describes an example of one among environments applicable to the example embodiments, and the environment applicable to the example embodiments is not limited to the network environment of FIG. 1.

The plurality of electronic devices 110, 120, 130, 140 may be fixed terminals which are implemented with a computer device or mobile terminals. As an example of the electronic devices 110, 120, 130, 140, there are a smart phone, a mobile phone, a navigation, a computer, a laptop, a digital broadcasting terminal, a PDA (Personal Digital Assistants), a PMP (Portable Multimedia Player), a tablet PC, and the like. As an example, FIG. 1 indicates a form of a smart phone as an example of the electronic device 110, but in the example embodiments, the electronic device 110 may actually mean one of various physical computer devices which may communicate with other electronic devices 120, 130, 140 and/or the servers 150, 160 through the network 170 by using a wireless or wired communication method.

The communication method is not limited, and it may include not only a communication method using a communication network that the network 170 may include (e.g., mobile communication network, wired Internet, wireless Internet, and a broadcasting network) but also a short-range wireless communication between devices. For example, the network 170 may include any at least one of networks of PAN (personal area network), LAN (local area network), CAN (campus area network), MAN (metropolitan area network), WAN (wide area network), BBN (broadband network), Internet, and the like. Also, the network 170 may include any one or more among network topologies including bus network, star network, ring network, mesh network, star-bus network, tree or hierarchical network, and the like, but it is not limited thereto.

Each of the servers 150, 160 may be implemented with a computer device or a plurality of computer devices providing an instruction, a code, a file, a content, a service, and the like by communicating with the plurality of electronic devices 110, 120, 130, 140 through the network 170. For example, the server 150 may be a system providing services (e.g., video call service, financial service, payment service, social network service, messaging service, search service, e-mail service, content providing service, question and answer service, and the like) to the plurality of electronic devices 110, 120, 130, 140 connected through the network 170.

Figure 2:
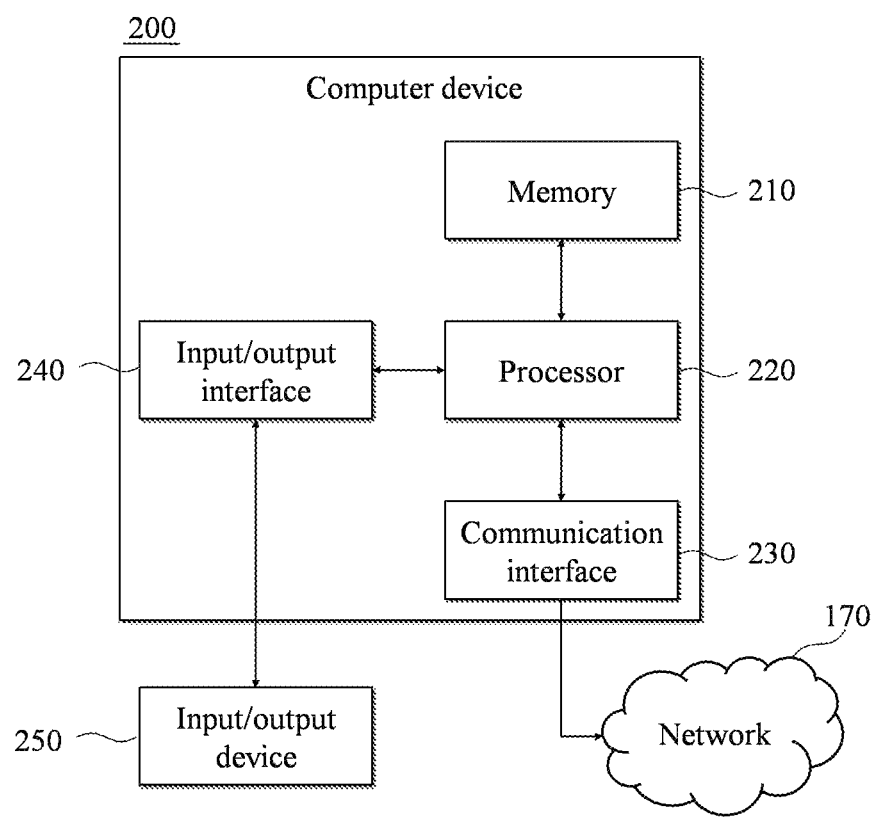
FIG. 2 is a drawing illustrating an example of a computer device according to an example of embodiments.

FIG. 2 is a drawing illustrating an example of a computer device according to an example of embodiments. Each of above described plurality of devices 110, 120, 130, 140 or each of servers 150, 160 may be implemented by a computer device 200 illustrated through FIG. 2, and a method according to the example embodiments may be performed by the computer device 200.

At this point, as illustrated in FIG. 2, the computer device may include a memory 210, a processor 220, a communication interface 230, and an input/output interface. The memory 210 may include a permanent mass storage device such as RAM (random access memory), ROM (read only memory) and a disc drive as computer-readable recording medium. Here, the permanent mass storage device such as ROM and disk drive may be included in the computer device 200 as a separate permanent storage device distinct from the memory 210. Also, the memory 210 may store OS and at least one program code. The software components may be loaded to the memory 210 from computer-readable recording medium separate from the memory 210. The separate computer-readable recording medium may include computer-readable recording medium such as a floppy drive, a disc, a tape, a DVD/CD-ROM drive, a memory card, and the like. In other example embodiments, the software components may be loaded to the memory 210 through the communication interface 230, not through the computer-readable recording medium. For example, the software components may be loaded to the memory 210 of the computer device 200 based on a computer program installed by files received through the network 170.

The processor 220 may be configured to process computer program instructions by performing basic arithmetic, logic, and input/output operation. The instructions may be provided to the processor 220 by the memory 210 or the communication interface 230. For example, the processor 220 may be configured to execute the instructions received according to a program code stored in a recording device such as the memory 210.

The communication interface 230 may provide a function for communicating the computer device 200 with other devices (e.g., the above described devices) through the network 170. For example, a request or an instruction, data, a file, and the like that the processor 220 of the computer device 200 generates according to a program code stored in a recording device such as the memory 210 may be transmitted to other devices through the network 170 according to control of the communication interface 230. Conversely, a signal or an instruction, data, a file, and the like from other devices may be received to the computer device 200 through the communication interface 230 of the computer device 200 by going through the network 170. The signal or the instruction, data, and the like received through the communication interface 230 may be transmitted to the processor 220 or the memory 210, and the file and the like may be stored in the storage medium (the above described permanent storage device) that the computer device 200 may further include.

The input/output interface 240 may be a means for interfacing with an input/output device 250. For example, an input device may include a device such as a microphone, a keyboard, a camera or a mouse, etc., and an output device may include a device such as a display, a speaker, and the like. As another example, the input/output interface 240 may be a means for interfacing with a device in which an input function and an output function are integrated into a single function such as a touch screen. The input/output device 250 may be configured with the computer device 200 as one device.

Also, in other example embodiments, the computer device 200 may include much less or much more components than the components of FIG. 2. However, there is no need to clearly illustrate most prior art components. For example, the computer device 200 may be implemented to include at least part of the described input/output device 250 or further include other components such as a transceiver, a database, and the like.

As various services and applications such as SaaS (Software as a Service), Cloud, Mobile App. Store, and the like may be easily utilized, users may expose their data to various third applications.

1. SaaS (e.g., Salesforce)

Various services related to SaaS are provided through appexchange, and users use their own data or services by connecting them with a third party service. Here, data on salesforce that individual user or business operators have may be provided through the third party service.

2. Cloud (e.g., Amazon's AWS (Amazon Web Service) market place)

Various applications, instance images, and the like which may be used in Cloud service environment are provided as a service. When users use desired service or application, data related to the corresponding service may be connected with the third party service, and provided.

3. Mobile App Store (e.g., Google Play Store and Apple App Store)

App developer/development company and publisher provide one or multiple apps to app store. Users use apps based on their needs, and different information may be provided to the developer/development company and publisher through each app. As an example of mobile app store environment, based on the number or mobile apps provided by the same developer/development company or publisher, a user installs multiple mobile apps and exposes different information through each app. In this case, there is no method for the user to separately recognize or identify the information exposure.

Figure 3:
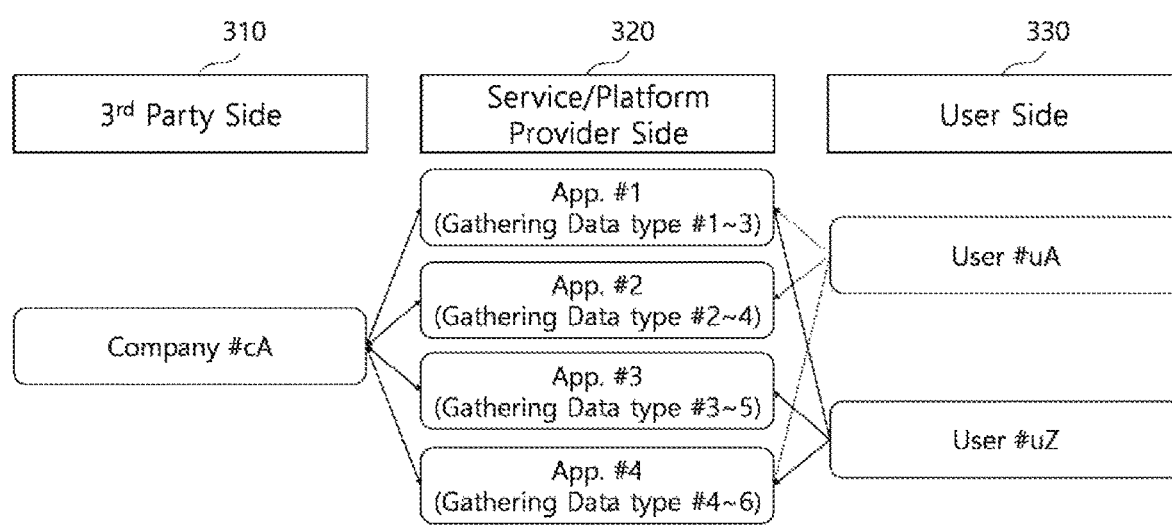
FIG. 3 is a drawing illustrating an example of main player-specific configuration of a system for risk identification of personal information according to an example of embodiments.

FIG. 3 is a drawing illustrating an example of main player-specific configuration of a system for risk identification of personal information according to an example of embodiments. FIG. 3 respectively represents a third party side 310, a service/platform provider side 320, and a user side 330 as main players of the system for risk identification of personal information.

The third party side 310 registers at least one application on the service/platform provider side 320, and may include a third party company (e.g. Company #cA represented in FIG. 3) providing service to the user side 330 through the application. The third party company may substantially correspond to a physical device implementing a service server providing service to a user terminal connected through network by using the application. FIG. 3 illustrates only one company Company #cA on the third party side 310, but multiple companies may substantially exist.

The service/platform provider side 320 receives registration for at least one application from at least one company of the third party side 310, and may include platform (e.g., SaaS, Cloud, mobile app store, and the like) providing the application to the user side 330. The example of FIG. 3 represents that the service/platform provider side 320 receives registration for App. #1, App. #2, App. #3, and App. #4 from the Company #cA, and may provide the applications to the user side 330. The service/platform provider side 320 represented in FIG. 3 may include multiple service providers and/or multiple platform providers.

The user side 330 is provided with desired application from the service/platform provider side 320, and may include users (e.g., User #uA and User #uZ represented in FIG. 3) provided with service from the third party side 310 through the application. Each user may substantially correspond to a user terminal (e.g., a PC, a smartphone, and the like) installing and running the application.

Meanwhile, in FIG. 3, it is supposed that App. #1 collects data of data types #1 to 3, App. #2 collects data of data types #2 to 4, App. #3 collects data of data types #3 to 5, and App. #4 collects data of data types #4 to 6. Also, it is supposed that User #uA installs and uses App. #1, App. #2, and App. #4 on a terminal of the User #uA, and User #uZ installs and uses App. #1, App. #3, and App. #4 on a terminal of User #uZ.

In this case, Company #cA collects all data of data types #1 to 6 for User #uA through App. #1, App. #2, and App. #4. Also, Company #cA collects all data of data types #1 to 6 for User #uZ through App. #1, App. #3, and App. #4.

Figure 4:
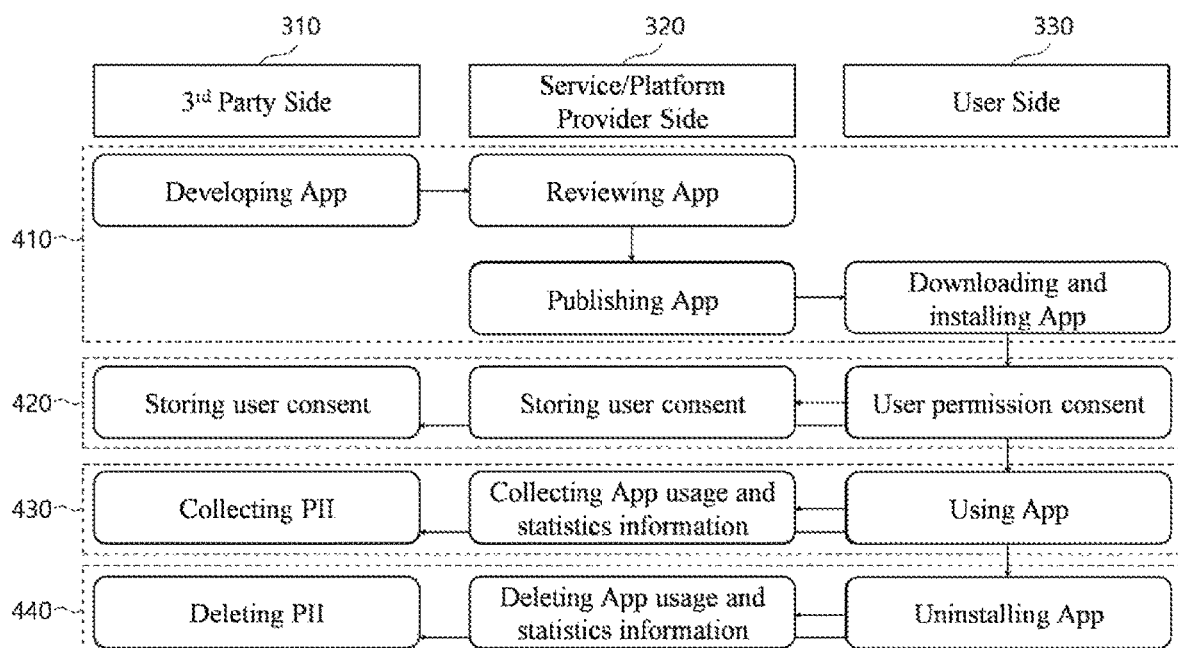
FIG. 4 is a flowchart illustrating an example of user data exposure flow in main player-specific configuration of a system for risk identification of personal information according to an example of embodiments.

FIG. 4 is a flowchart illustrating an example of user data exposure flow in main player-specific configuration of a system for risk identification of personal information according to an example of embodiments.

A first dotted lined box 410 represents an example of a process that an app developed on the third party side 310 is registered on the service/platform provider side 320, the service/platform provider side 320 reviews and publishes the registered app, and the user side 330 downloads and installs the published app through a terminal. Here, the app may be a generic term for application, service, mobile app provided from the third party side 310.

A second dotted lined box 420 represents an example of a process that as the user side 330 consents to user permission, each of the service/platform provider side 320 and the third party side 310 stores the user consent.

A third dotted lined box 430 represents an example of a process that as the user side 330 uses the app installed in the terminal, the service/platform provider side 320 collects app usage and statics information, and the third party side 310 collects PII (Personally Identifiable Information).

A fourth dotted lined box 440 represents an example of a process that as the user side 330 deletes the app installed in the terminal, the service/platform provider side 320 deletes the app usage and statics information, and the third party side 310 deletes PII.

Figure 5:
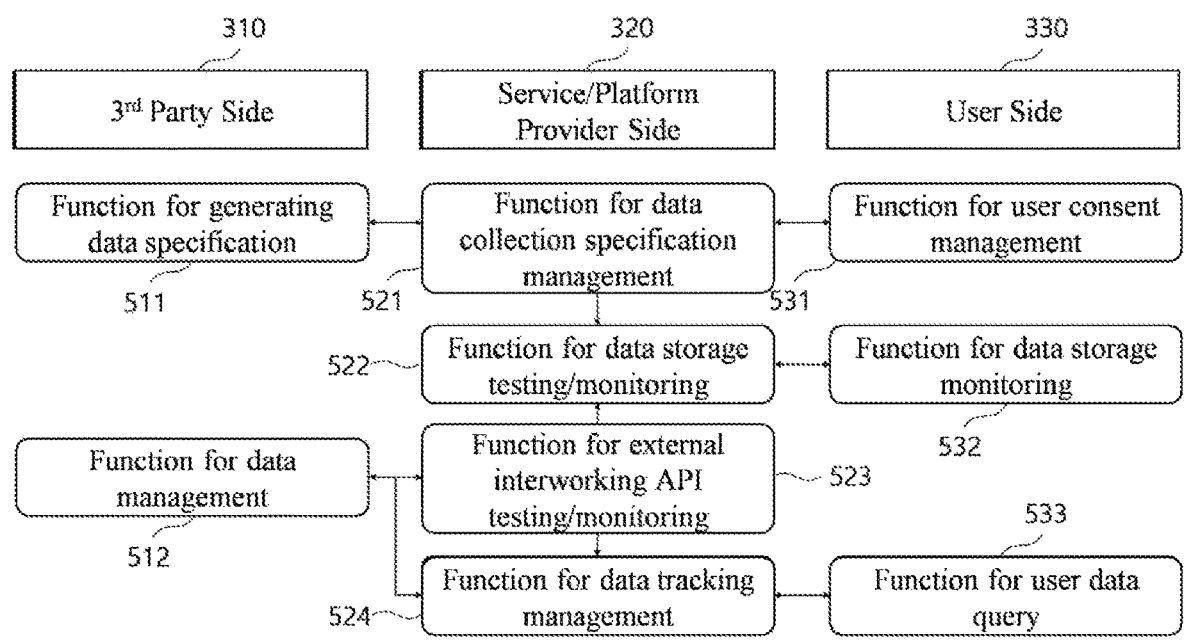
FIG. 5 is a drawing illustrating an example of main player-specific function block of a system for risk identification of personal information according to an example of embodiments.

FIG. 5 is a drawing illustrating an example of main player-specific function block of a system for risk identification of personal information according to an example of embodiments.

The third party side 310 may make a specification related to user data collection in user, service, application environment, and for this, a function for generating data specification 511 and a function for data management 512 may be included.

The service/platform provider side 320 may review information related to collecting of user data and system data (review based on storage) at the point of service and application examination (review), may review external interworking API and data flow (review based on network), and may review matching with user consent item and data collection specification item. For this, the service/platform provider side 320 may include a function for data collection specification management 521, a function for data storage testing/monitoring 522, a function for external interworking API testing/monitoring 523, and a function for data tracking management 524.

Client related to the user side 330, substantially application (or service) provided to the user side 330 may perform user consent process, and confirm collected data information. For this, the client may include a function for user consent management 531, a function for data storage monitoring 532, and a function for user data query 533.

The function for generating data specification 511 included in the third party side 310 may provide a function for generating data specification for PII collected and utilized from service or application developed from the third party side 310, and may provide a function for generating workflow for user consent and management. More particularly, the function for generating data specification 511 may generate self-specification for data usage of service and/or application developed from the third party side 310. The function for generating data specification 511 may be implemented to generate specification for contents which should specify information according to GDPR (General Data Protection Regulation) or Personal Information Protection Act, and may provide the generated specification to the service/ platform provider side 320. For example, the specification may be generated and provided in XML (eXtensible Markup Language) form, and data interface may be implemented in JSON (JavaScript Object Notation) form. To ensure reliability of the function for generating data specification 511, by providing or adding the corresponding specification on blockchain provided by another third party side, another service/platform provider side or another business operator, the reliability for the utilizing data specification may be ensured.

Also, the function for data management 512 included in the third party side 310 may provide anonymity function through tracking and unidentification for data collected by the third party side 310, and may provide a function for providing data statistic for each user. The function for data management 512 may provide a management function for data directly collected from service and/or application by the third party side 310 or profile, statistics information, and the like provided from the service/platform provider side 320. Particularly, when the client of the user side 330, service/platform provider side 320 or a government agency requires a monitoring function for utilizing of the collected data, the collected data may be provided in statistics form, and the collected information may be immediately deleted as needed.

The function for data collection specification management 521 included in the service/platform provider side 320 may provide a function for specification management related to data usage provided from the third party side 310, and may provide a snapshot function for users' consent information. Here, snapshot data generated through the snapshot function may be distributively managed in blockchain form to prevent forgery of data. More particularly, the function for data collection specification management 521 may store and manage specification contents related to data usage provided from the third party side 310, maintain a contract form for the stored contents during the service period, and add separate maintenance period and constraints for data utilization. The contract information may be provided to separate block chain or another reliable business operator in snapshot form which is described above, and stored. Here, the client of the user side 330 or a supervisory agency of a government agency may request and confirm the contract information. The information which may be requested and confirmed by the client of the user side 330 may be limited to the information related to service and/or application that a user of the corresponding client is using.

Also, the function for data storage testing/monitoring 522 included in the service/platform provider side 320 may provide an examination function for security, nonidentification, anonymization, and the like of data stored in data storage of service and/or application of the third party side 310, and provide a monitoring function for physical access to the data storage. More particularly, the function for data storage testing/monitoring 522 may inspect and monitor a process related to data storing and processing in user environment or platform environment (e.g., IAAS (Infrastructure as a Service)/PAAS (Platform as a Service) when using Cloud) for service and/application provided by the third party side 310. Here, the function for data storage testing/monitoring 522 may specify information for security, non-identification, and anonymization related to data processing, and determine whether to register the corresponding service and/or application based on the specified information. Also, the function for data storage testing/monitoring 522 may provide a function for separately monitoring access from the outside when the corresponding data storage is service provided in SaaS form.

Also, the function for external interworking API testing/monitoring 523 included in the service/platform provider side 320 may provide a function for monitoring external interworking API and network of service and/or application of the third party side 310, and provide an examination function for end-to-end encryption, nonidentification, anonymization. More particularly, when service and/or application is interworked with external service, to monitor the correspond information, the service/platform provider side 320 may examine information related to the external service interwork through the function for external interworking API testing/monitoring 523 when inspecting the corresponding service and/or application, and register whether to monitor the corresponding information on platform or PaaS of the client of the user side 330. Here, the function for external interworking API testing/monitoring 523 may determine whether risk is identified or not based on whether to end-to-end encrypt, whether to unidentify, and whether to anonymize related to the external interwork. Also, the function for external interworking API testing/monitoring 523 may examine communication with a server using network information (address) which is not specified on the specification or not authenticated.

Also, the function for data tracking management 524 included in the service/platform provider side 320 may provide a function for tracking management for data stored in platform (e.g. mobile OS) of service and/or application of the third party side 310, and the function for tracking management may be connected with the function for data storage testing/monitoring. Also, the function for data tracking management 524 may provide a function for storing and tracking management for specification data when interrupting service due to user withdrawal or usage expiration. More particularly, the function for data tracking management 524 may provide a monitoring function for data stored on the service/platform provider side 320 by service and/or application. Also, the function for data tracking management 524 may provide the monitoring function along with data collected to provide service on service and/or platform (e.g. common login information, user profile, payment related profile, tax related profile, and the like). The service/platform provider side 320 should provide a function for separately monitoring corresponding information to the client of the user side 330, another third party side or a government agency, and the like. When the function for separately monitoring is provided on blockchain in snapshot form, the service/platform provider side 320 should notify separate information for the monitoring function on blockchain.

The function for user consent management 531 included in the client of the user side 330 may provide a function for storing data snapshot of the service/platform provider side 320 or an authorized agency for user consent information when running initial app. More particularly, the function for user consent management 531 may store user consent information, and provide the user consent information to the service/platform provider side 320. Also, it is possible to provide with the user consent information to reliable third party. For example, the function for user consent management 531 may store user consent information in snapshot form on blockchain of another business operator. Here, the user consent information should be additionally notified to the client, and the storing and managing method should be referred. The function for user consent management 531 may provide a function for confirming user consent information in separate control window or environment.

Also, the function for data storage monitoring 532 may provide a monitoring function for physical access to the data storage, and provide a monitoring function for whether the data is completely deleted when deleting the app. More particularly, in case of service and/or application operated in client environment, the function for data storage monitoring 532 should monitor whether to physically access to the data storage of client device (e.g., a user terminal such as a user side device 600 which will be described through FIG. 6 hereafter). For this, a sandbox function which may control this may be provided from OS or service platform of the client device. Also, the function for data storage monitoring 532 may provide a function for completely deleting data in sandbox when deleting service and/or application (deleting it in the client device).

Also, the function for user data query 533 included in the client of the user side 330 may provide a query function related to user's data right (right for modification and deletion of data), and provide a link connecting to a function for data query separately provided from the platform provider side. For example, a link may be provided for connecting information management page of an app deleted on setting page of mobile OS. More particularly, the function for user data query 533 may provide a means (e.g., URL, Web form, and the like) that a user and/or client may query for present situation related to his or her own data. The function for user data query 533 should explicitly provide such means, and expose the query means at start point of service (e.g., installation and contract of application) and end point of service (e.g., deletion of application or withdrawal of service). According to an example embodiment, when a user terminal (or client device) is controlled from the service/platform provider side 320, the service/platform provider side 320 may provide information according to the query through separate information management page.

Figure 6:
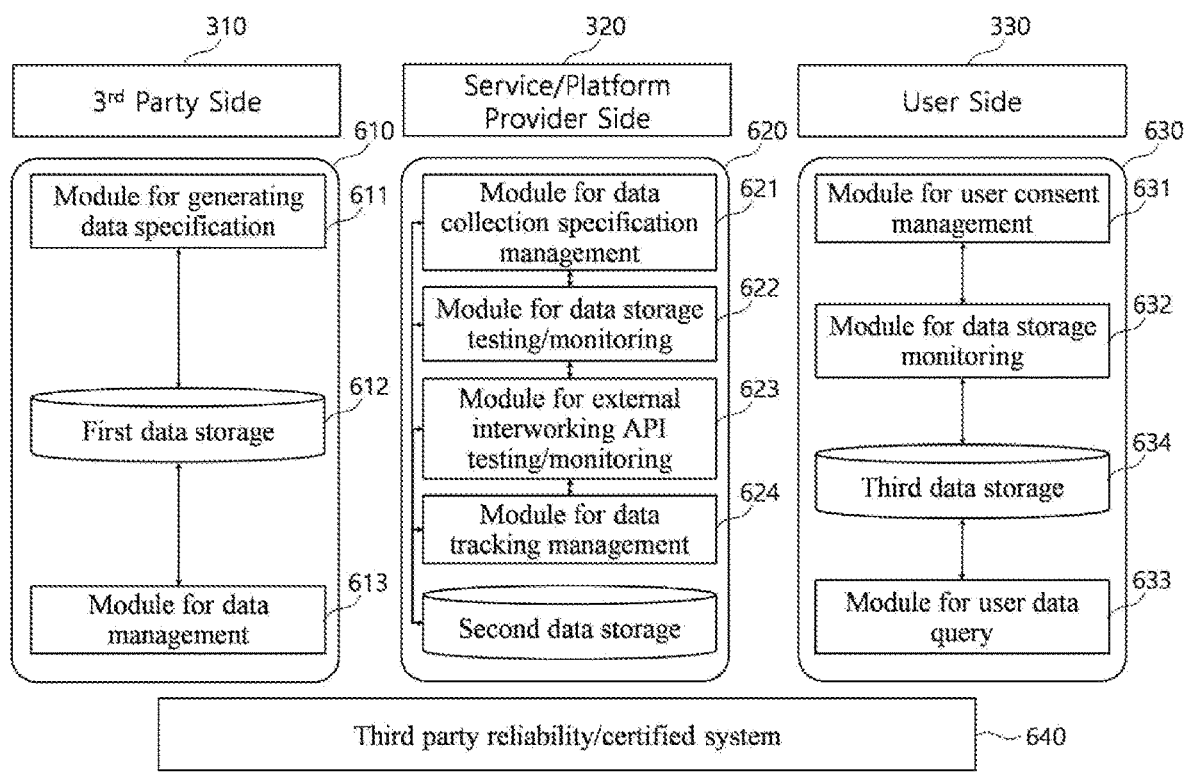
FIG. 6 is a block diagram illustrating an example of internal configuration of a system for risk identification of personal information according to an example of embodiments.

FIG. 6 is a block diagram illustrating an example of internal configuration of a system for risk identification of personal information according to an example of embodiments. FIG. 6 represents a third party side device 610 that each of companies (e.g., service and/or application developer or development company) included in the third party side 310 may include, a service/platform provider side device 620 that each of service providers and/or platform providers included in the service/platform provider side 320 may include, a user side device 630 which may correspond to each of terminals of users included in the user side 330, and a third party reliable/certified system 640.

Here, each of modules 611, 612, 621, 622, 623, 624, 631, 632, 633 represented in FIG. 6 may be expressions of different functions performed by at least one processor that each of the third party side device 610, the service/platform provider side device 620, and the user side device 630 may include. For example, each of the third party side device 610, the service/platform provider side device 620, and the user side device 630 may include a computer program to execute a method for risk identification of personal information in a computer, and at least one processor that each of the third party side device 610, the service/platform provider side device 620, and the user side device 630 may include may control the third party side device 610, the service/platform provider side device 620, or the user side device 630 to process a function provided a corresponding module among the modules 611, 612, 621, 622, 623, 624, 631, 632, 633 according to control instruction according to a program code of a corresponding computer program. For example, a module for generating data specification 611 may be a functional expression for a function for controlling the third party side device 610 for the processor of the third party side device 610 to generate the data specification. Also, the modules 611, 612, 621, 622, 623, 624, 631, 632, 633 represented in FIG. 6 may provide the functions 511, 512, 521, 522, 523, 524, 531, 532, 533 described through FIG. 5. For example, the module for generating data specification 611 may be a functional expression of the processor of the third party side device 610 controlling the third party side device 610 to perform the function for generating data specification 511.

Meanwhile, a first data storage 613, a second data storage 625, and a third data storage 634 may be physical storages of the third party side device 610, the service/platform provider side device 620, and the user side device 630. For example, a processor of the third party side device 610 may generate data specification by performing the function for generating data specification 511 through the module for generating data specification 611, and control the third party side device 610 to store the generated specification in the first data storage 613 which is the physical storage of the third party side device 610.

Figure 7:
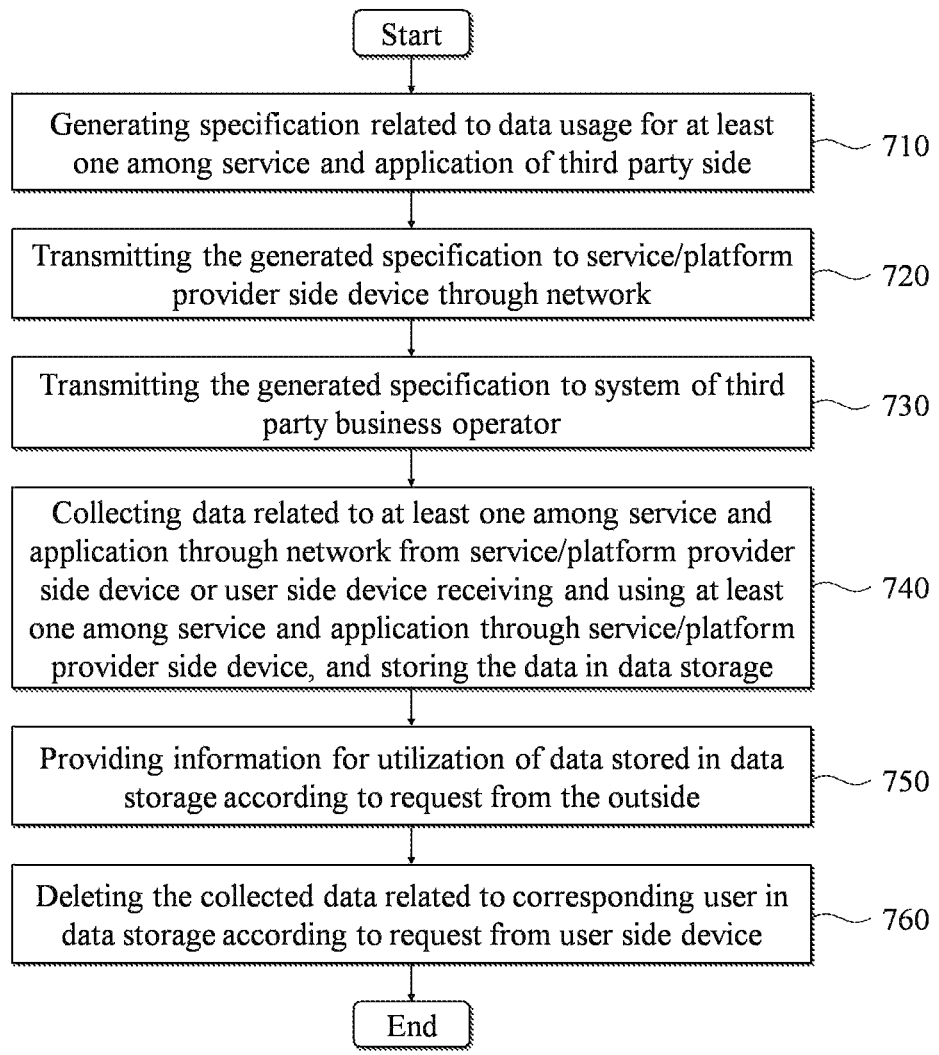
FIG. 7 is a flowchart illustrating an example of a method for risk identification of personal information in the view of a third party side according to an example of embodiments.

FIG. 7 is a flowchart illustrating an example of a method for risk identification of personal information in the view of third party side according to an example of embodiments. A method for risk identification of personal information according to an example embodiment may be performed by the computer device 200 implementing the third party side device 610 described through FIG. 6. For example, the processor 220 of the computer device 200 may be implemented to execute control instruction according to OS or at least one program code included in the memory 210. Here, the processor 220 may control the computer device 200 to perform Steps 710 to 760 included in the method of FIG. 7 according to control instruction provided code stored in the computer device 200.

In Step 710, the computer device 200 may generate a specification related to data usage for at least one among service and application of a third party side. Here, the third party side may correspond to the third party side 310 described above through FIGS. 3 to 6.

In Step 720, the computer device 200 may transmit the generated specification to a service/platform provider side device through network. Here, the service/platform provider side device may correspond to the service/platform provider side device 620 described through FIG. 6, and the transmitted specification may be stored and managed in the second data storage 625 included in the service/platform provider side device 620. The service/platform provider side device 620 may maintain the specification contents in contract from during service period, and add separate maintenance period and constraint condition for data utilization. Such contract formed information may be provided to a system (the third party side device 610) of a third party business operator (the third party side 310) in snapshot form, and stored.

In Step 730, the computer device 200 may transmit the generated specification to the system of the third party business operator. Such transmitting specification to the system of the third party business operator is for ensuring reliability of the specification, and for greater reliability, the specification transmitted to the system of the third party business operator may be distributively stored on blockchain related to the third party business operator. Here, the snapshot formed information which is transmitted to the third party business operator by the service/platform provider side device 620 also may be distributively stored on blockchain related to the third party business operator.

In Step 740, the computer device 200 may collect data related to at least one among service and application through network from the service/platform provider side device or the user side device receiving and using at least one among service and application through the service/platform provider device, and store the data in data storage. For example, in Step 740, the data collected by the computer device 200 may include PII of a user related to at least one among service and application.

In Step 750, the computer device 200 may provide information for utilization of data stored in the data storage according to a request from the outside. For example, the computer device 200 may provide a monitoring function for information for data utilization in statistics form according to a request from at least one among a user side device, a service/platform provider device, and a government agency.

In Step 760, the computer device 200 may delete the collected data related to a corresponding user in the data storage according to a request from the user side device. Deleting collected data according to a request of the user may satisfy right of erasure that GDPR (General Data Protection Regulation) requires.

Figure 8:
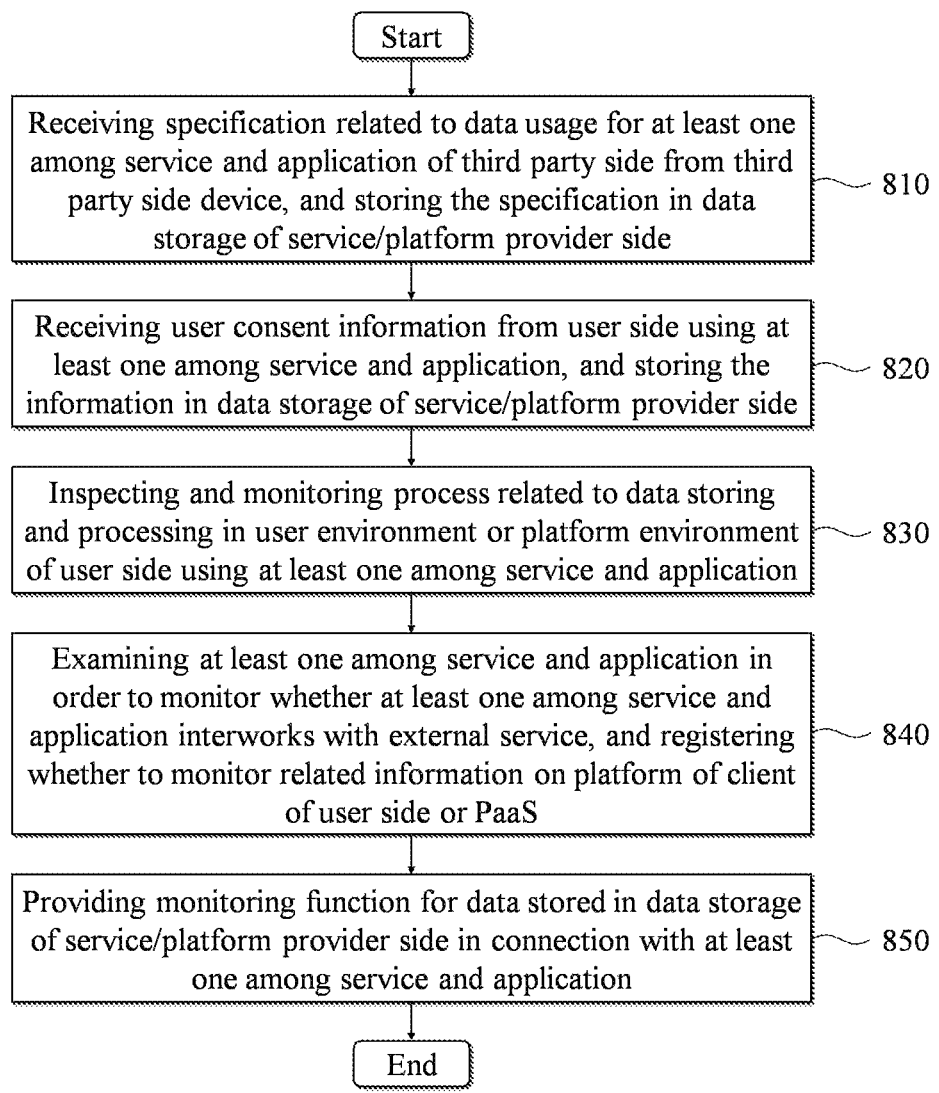
FIG. 8 is a flowchart illustrating an example of a method for risk identification of personal information in the view of a service/platform provider side according to an example of embodiments.

FIG. 8 is a flowchart illustrating an example of a method for risk identification of personal information in the view of service/platform provider side according to an example of embodiments. The method for risk identification of personal information according to an example embodiment may be performed by the computer device 200 implementing the service/platform provider side device 620 described through FIG. 6. For example, the processor 220 of the computer device 200 may be implemented to execute control instruction according to code of OS or code of at least one program included in the memory 210. Here, the processor 220 may control the computer device 200 to perform Steps 810 to 850 included in the method of FIG. 8 according to control instruction provided code stored in the computer device 200.

In Step 810, the computer device 200 may receive a specification related to data usage for at least one among service and application of a third party side, and store the specification in data storage of a service/platform provider side. Here, the third party side may correspond to the third party side 310 described above through FIGS. 3 to 6, and the service/platform provider side may correspond to the service/platform provider side 320 described above through FIGS. 3 to 6.

In Step 820, the computer device 200 may receive user consent information from a user side using at least one among service and application, and store the information in data storage of the service/platform provider side. Here, the user side may correspond to the user side 330 described through FIGS. 3 to 6. For example, when installing and running an application on a client device of the user side, the client device may receive and store input for user consent information from the user side according to control of the application, and transmit the user consent information to the service/platform provider side. Here, the computer device 200 may receive the transmitted user consent information, and store the information in data storage.

In Step 830, the computer device 200 may inspect and monitor a process related to data storing and processing in user environment or platform environment of the user side using at least one among service and application. In this case, the computer device 200 may specify information for security, nonidentification, and anonymization related to data storing and processing, and determine whether to register at least one among service and application based on the specified information. Also, the computer device 200 may monitor access to the data storage from the outside when the data storage related to data storing and processing is service provided in SaaS (Software as a Service) form.

In Step 840, the computer device 200 may examine at least one among service and application and register whether to monitor for the related information on platform or PaaS (Platform as a Service) of a client of the user side, in order to monitor that at least one among service and application interworks with external service. Also, the computer device 200 may examine communication with a server using network address which is not specified on the specification received in Step 840 or not authenticated.

In Step 850, the computer device 200 may provide a monitoring function for data stored in the data storage of the service/platform provider side related to at least one among service and application. For example, the computer device 200 may provide a monitoring function for data that at least one among service and application stores in the data storage of the service/platform provider side or the data collected by the service/platform provider side to provide service.

Figure 9:
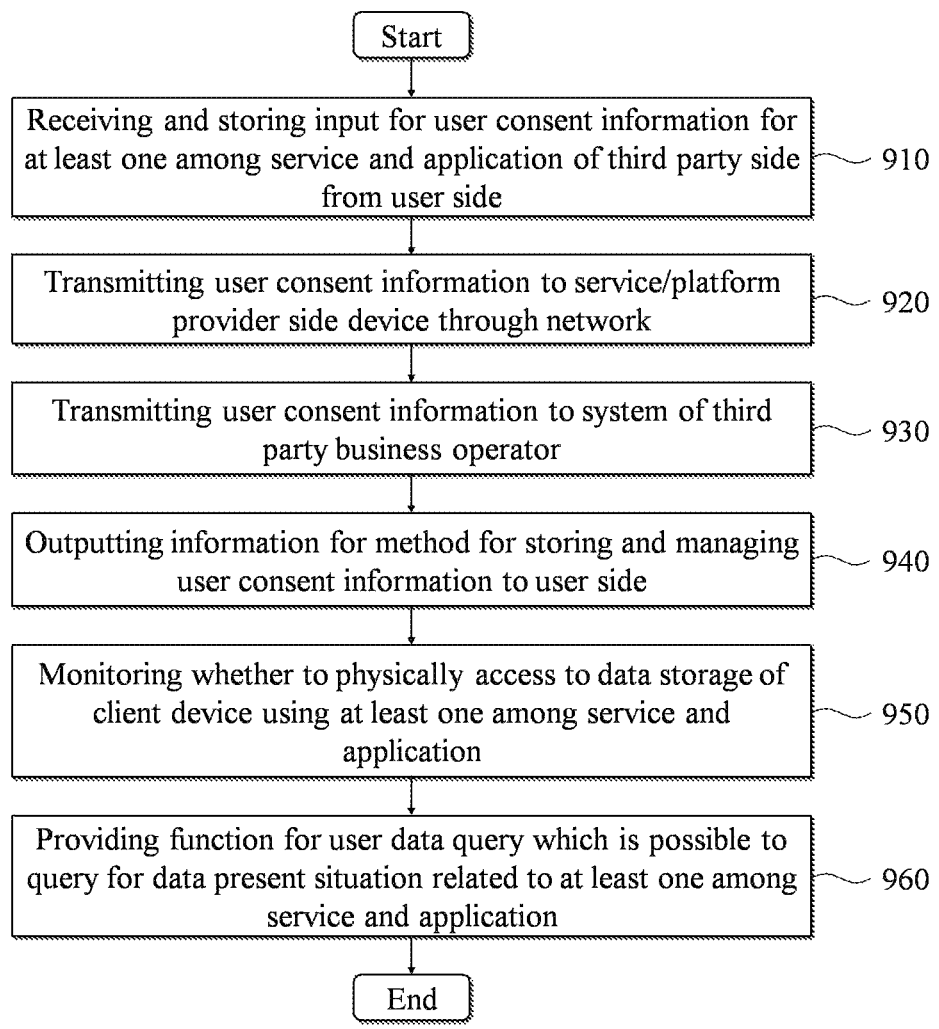
FIG. 9 is a flowchart illustrating an example of a method for risk identification of personal information in the view of a user side according to an example of embodiments.

FIG. 9 is a flowchart illustrating an example of a method for risk identification of personal information in the view of a user side according to an example of embodiments. The method for risk identification of personal information according to an example embodiment may be performed by the computer device 200 implementing the user side device 630 described through FIG. 6. For example, the processor 220 of the computer device 200 may be implemented to execute control instruction according to code of OS or code of at least one program included in the memory 210. Here, the processor 220 may control the computer device 200 to perform Steps 910 to 960 included in the method of FIG. 9 according to control instruction provided code stored in the computer device 200.

In Step 910, the computer device 200 may receive and store input for user consent information for at least one among service and application of a third party side from the user side. Here, the third party side may correspond to the third party side 310 described above through FIGS. 3 to 6.

In Step 920, the computer device 200 may transmit the user consent information to a service/platform provider side device through network. Here, the service/platform provider side may correspond to the service/platform provider side 320 described trough FIGS. 3 to 6.

In Step 930, the computer device 200 may transmit the user consent information to a system of a third party business operator. The user consent information transmitted to the system of the third party business operator may be distributively stored on blockchain related to the third party business operator in order to increase reliability for storing the user consent information.

In Step 940, the computer device 200 may output information for a method for storing and managing user consent information to the user side. Accordingly, the user may inquire the user consent information for service and/or application.

In Step 950, the computer device 200 may monitor whether to physically access to data storage of a client device using at least one among service and application. For example, the computer device 200 may monitor whether to physically access to data storage of the client device by using a sandbox function provided by service platform of service provided to OS of the client device or the client device. Here, the computer device 200 may delete data in the sandbox according to a request of the user side.

In Step 960, the computer device 200 may provide a function for user data query which is possible to query for data present situation related to at least one among service and application. For example, the computer device 200 may provide the function for user data query at least one point among start point and end point of at least one among service and application. As another example, the computer 200 may receive a function for information management in which the function for user data query is included from the service/platform provider side device controlling the client device, and provide the function to the user side.

Likewise, according to the example embodiments, it may be provided with a technology for risk identification of personal information generating and providing a specification for service and/or application in the view of the third party side and collecting and managing data related to service and/or application. Also, it may be provided with a technology for risk identification of personal information for receiving and managing a specification for service and/or application from the third party side in the view of the service/platform provider side, receiving and managing user consent information from the user side using service and/or application, inspecting and monitoring a process related to data storing and processing in user environment or platform environment of the user side, and providing a monitoring function for data stored in data storage of the service/platform provider side. Also, it may be provided with a technology for risk identification of personal information for storing and providing user consent information for service and/or application of the third party side in the view of the user side, monitoring whether to physically access to data storage of the client device, and providing a query function for collected data present situation.

The units described herein may be implemented using hardware components, software components, and/or a combination thereof. For example, a processing device may be implemented using one or more general-purpose or special purpose computers, such as, for example, a processor, a controller, an ALU (arithmetic logic unit), a digital signal processor, a microcomputer, a FPGA (field programmable gate array), a PLU (programmable logic unit), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied in any type of machine, component, physical or virtual equipment, computer storage medium or device to provide instructions or data to or be interpreted by the processing device. The software also may be distributed over network coupled computer systems so that the software is stored and executed in a distributed fashion. In particular, the software and data may be stored by one or more computer readable recording mediums.

The method according to the example embodiments may be implemented in a form of program instruction which may be performed through various computer means and recorded in computer-readable media. The media may also include, alone or in combination with the program instructions, data files, data structures, and the like. The media may be continuously storing a program which may be executed with a computer, or temporarily storing for execution or download. Also, the media may be various recording means or storing means in a form of single or a plurality of hardware which are combined, but it is not limited to a media directly accessed to any computer system, and it may be distributed on network. Examples of the media include magnetic media such as hard disks, floppy disks, and magnetic tape; optical media such as CD ROM disks and DVD; magneto-optical media such as floptical disks; and hardware devices that are specially configured to store and perform program instructions, such as ROM (read-only memory), RAM (random access memory), flash memory, and the like. Also, examples of other media include app store distributing applications or recording media and storing media managed in sites, servers, and the like distributing other many software. Examples of program instructions include both machine code, such as produced by a compiler, and higher level code that may be executed by the computer using an interpreter.

While certain example embodiments and implementations have been described herein, other embodiments and modifications will be apparent from this description. Accordingly, the invention is not limited to such embodiments, but rather to the broader scope of the presented claims and various obvious modifications and equivalent arrangements.

The embodiments of the invention in which an exclusive property or privilege is claimed are defined as follows:

1. A method for risk identification of personal information of a service/platform provider side comprising:
   receiving a specification related to data usage for at least one among service and application of a third party side from a device of the third party side and storing the received specification in data storage of the service/platform provider side, wherein the specification specifies at least one network address used by a server with which data will be communicated;
   receiving user consent information from a user side using at least one among the service and application and storing the received user consent information in the data storage of the service/platform provider side;
   inspecting and monitoring a process related to data storing and processing in user environment or platform environment of the user side using at least one among the service and application;
   providing a monitoring function for data stored in the data storage of the service/platform provider side in connection with at least one among the service and application; and
   examining communication with a server using a network address which is not specified on the specification.

2. The method for risk identification of personal information of claim 1, further comprising specifying information for security, nonidentification, and anonymization related to the data storing and processing, and determining whether to register for at least one among the service and application.

3. The method for risk identification of personal information of claim 1, further comprising monitoring access to the data storage from the outside in case that the data storage related to the data storing and processing is service provided in SaaS (Software as a Service) form.

4. The method for risk identification of personal information of claim 1, wherein at least part of the data stored in the data storage of the service/platform provider side is managed in snapshot form.

5. The method for risk identification of personal information of claim 4, further comprising transmitting the snapshot formed data to the device of the third party side, and
wherein the snapshot formed data transmitted to the device of the third party side is distributively stored on blockchain related to the third party side.

6. The method for risk identification of personal information of claim 1, further comprising examining at least one of the service and application and registering whether to monitor the related information on platform on a client of the user side or PaaS (Platform as a Service), in order to monitor whether at least one of the service and application is interworked with external service.

7. The method for risk identification of personal information of claim 1, further comprising examining communication with a server that is not authenticated.

8. The method for risk identification of personal information of claim 1, wherein the providing a monitoring function provides the monitoring function for data stored in the data storage of the service/platform provider side by at least one among the service and application or data collected by the service/platform provider side to provide service.

9. The method for risk identification of personal information of claim 1, wherein the device of the third party side is implemented to process:
a first process for generating the specification;
a second process for transmitting the generated specification to the device of the service/platform provider side through network;
a third process for collecting data related to at least one among the service and application through network, from the device of the service/platform provider side or a device of the user side receiving and using at least one among the service and application through the device of the service/platform provider side, and storing the collected data in the data storage; and
a fourth process for providing information for utilization of data stored in the data storage according to a request from the outside of the device of the third party side.

10. The method for risk identification of personal information of claim 9, wherein the device of the third party is implemented to further process a fifth process for deleting collected data related to a corresponding user in the data storage according to a request from the device of the user side.

11. The method for risk identification of personal information of claim 9, wherein the generated specification is distributively stored on blockchain related to the third party side.

12. The method for risk identification of personal information of claim 9, wherein the fourth process comprises a process for providing a function capable of monitoring the information for utilization of the data in statistics form according to a request of at least one among the device of the user side, the device of the service/platform provider side, and a government agency.

13. The method for risk identification of personal information of claim 1, wherein the device of the user side is implemented to process:
a first process for receiving and storing input for user consent information for at least one among the service and application of the third party side from the user side;
a second process for transmitting the user consent information to the device of the service/platform provider side through network;
a third process for monitoring whether to physically access to the data storage included in the device of the user side using at least one among the service and application; and
a fourth process for providing a user data query function which is possible to query for data present situation related to at least one among the service and application.

14. The method for risk identification of personal information of claim 13, wherein the device of the user side is implemented to further process:
a fifth process for providing a function for verifying the stored user consent information;
a sixth process for transmitting the user consent information to the device of the third party side;
a seventh process for outputting the information for a method for storing and managing the user consent information to the user side.

15. The method for risk identification of personal information of claim 14, wherein the user consent information transmitted to the device of the third party side is distributively stored on blockchain related to the third party side.

16. The method for risk identification of personal information of claim 13, wherein the third process comprises a process for monitoring whether to physically access to the data storage of the user side by using a sandbox function provided by OS included by the device of the user side or service platform of service provided to the device of the user side, and
the device of the user side is implemented to further process an eighth process for deleting data in the sandbox according to a request of the user side.

17. A computer device comprising at least one processor implemented to execute computer-readable instructions, and
wherein the computer device, by executing the computer-readable instructions with the at least one processor,
receives a specification related to data usage for at least one among service and application of a third party side from a device of the third party side and stores the received specification in data storage of a service/platform provider side, wherein the specification specifies at least one network address used by a server with which data will be communicated,
receives user consent information from a user side using at least one among the service and application and stores the received user consent information in the data storage of the service/platform provider side,
inspects and monitors a process related to data storing and processing in user environment or platform environment of the user side using at least one among the service and application,
provides a monitoring function for data stored in the data storage of the service/platform provider side in connection with at least one among the service and application, and
examines communication with a server using a network address which is not specified on the specification.

18. The computer device of claim 17, wherein the device of the third party side, by the at least one processor included by the device of the third party side, is implemented to process:
a first process for generating the specification;

a second process for transmitting the generated specification to the device of the service/platform provider side through network;

a third process for collecting data related to at least one among the service and application through network from the device of the service/platform provider side or the device of the user side receiving and using at least one among the service and application through the device of the service/platform provider side, and storing the collected data in the data storage; and a fourth process for providing information for utilization of the data stored in the data storage according to a request from the outside of the device of the third party side.

19. The computer device of claim 17, wherein the device of the user side, by the at least one processor included by the device of the user side, is implemented to process:

a first process for receiving and storing input for user consent information for at least one among the service and application of the third party side from the user side;

a second process for transmitting the user consent information to the device of the service/platform provider side through network;

a third process for monitoring whether to physically access to the data storage included by the device of the user side using at least one among the service and application; and a fourth process for providing a user data query function which is possible to query for data present situation related to at least one among the service and application.

* * * * *